Jan. 9, 1968  R. P. SMITH ET AL  3,362,424
FLUID PRESSURE REGULATING SYSTEM

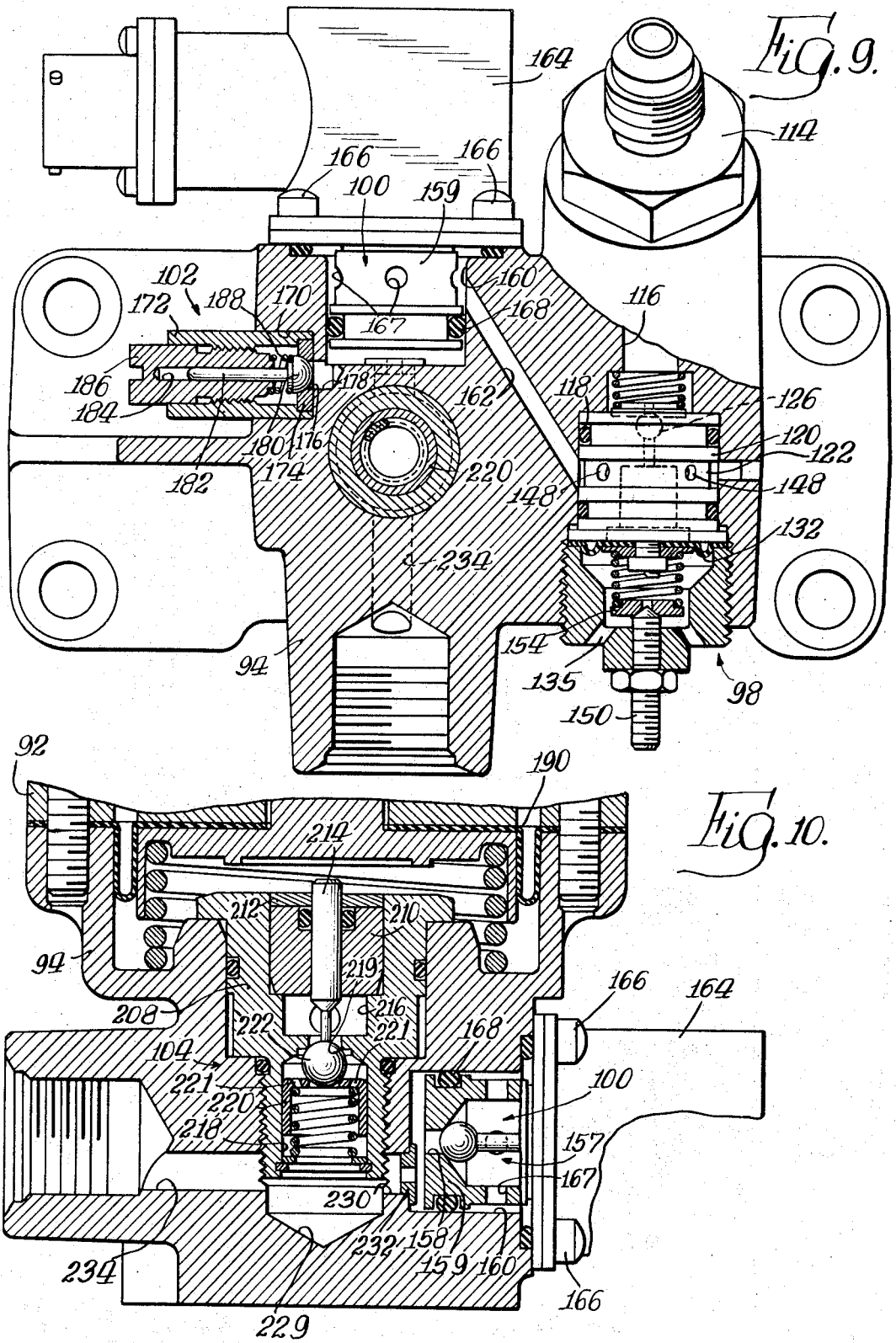

Filed May 5, 1965  5 Sheets-Sheet 5

United States Patent Office 3,362,424
Patented Jan. 9, 1968

3,362,424
FLUID PRESSURE REGULATING SYSTEM
Robert P. Smith, Lincolnwood, and Vijay K. Zadoo, Chicago, Ill., assignors to Vapor Corporation, Chicago, Ill., a corporation of Delaware
Filed May 5, 1965, Ser. No. 453,309
6 Claims. (Cl. 137—220)

ABSTRACT OF THE DISCLOSURE

A fluid pressure regulating system having interposed in conduit means a back pressure regulating valve, which is controlled by a pressure control unit responsive to the difference between the upstream pressure and a reference pressure, and which also serves as a relief valve.

Our present invention relates generally to a fluid pressure regulating system and more particularly to a pressure relief and back pressure regulating system.

It is a primary object of our present invention to provide a fluid pressure regulating system whereby the pressure of air in a particular pressurized enclosed area may be maintained at a predetermined desired value above the pressure of air in another enclosed area.

It is another object of our present invention to provide a fluid pressure regulating system, as described, which is especially adapted for use in aircraft applications. In one such application, the system is adapted to maintain the pressure of the air in an aircraft pressurized suit at a predetermined desired value above the pressure of the air in the cabin whether the cabin is pressurized or unpressurized.

It is another object of our present invention to provide a fluid pressure regulating system, as described, wherein a back pressure regulating valve serves to modulate the flow of air under pressure to the suit and cabin, and a pressure control unit serves to sense the air pressure in the suit and cabin and uses a source of high pressure air to vary the valve position in order to maintain the desired air pressure in the suit.

It is another object of our present invention to provide a fluid pressure regulating system, as described, wherein the pressure regulating valve and the pressure control unit are fabricated as separate units thereby allowing the valve to be placed in an adverse environment resulting, for example, from high temperature or from extreme vibration, while the control unit is located in a more compatible environment, thus contributing to more accurate control.

It is a further object of our present invention to provide a back pressure regulating valve, as described, which also serves as a relief valve, in the event a system malfunction should cause the valve to close, to prevent overpressurization of the suit and possible loss of the aircraft.

It is a further object of our present invention to provide a back pressure regulating and relief valve, as described, which incorporates a one-piece back pressure regulating and relief poppet valve. This arrangement eliminates the necessity of installing a separate relief valve (and associated ducting and clamps) in the pressure control system, and thus reduces the weight and cost of the system.

It is a still further object of our present invention to provide a back pressure regulating and relief valve, as described, wherein the inlet opening, the outlet opening, the back pressure regulating and relief poppet valve, and the actuating piston are coaxially arranged to minimize pressure loss, and maximize flow, through the valve.

Now in order to acquaint those skilled in the art with the manner of constructing and using a fluid pressure regulating system incorporating the principles of our present invention, we shall describe in connection with the accompanying drawings a preferred embodiment of our invention.

In the drawings:

FIGURE 4 is a plan view of the pressure control unit of our present invention;

FIGURE 5 is an elevational view of one side of the pressure control unit of FIGURE 4;

FIGURE 6 is an elevational view of another side of the pressure control unit of FIGURE 4;

FIGURE 9 is a sectional view, taken generally along the line 9—9 in FIGURE 6, looking in the direction indicated by the arrows;

FIGURE 10 is a sectional view, taken substantially along the line 10—10 in FIGURE 6, looking in the direction indicated by the arrows.

Figure 1:
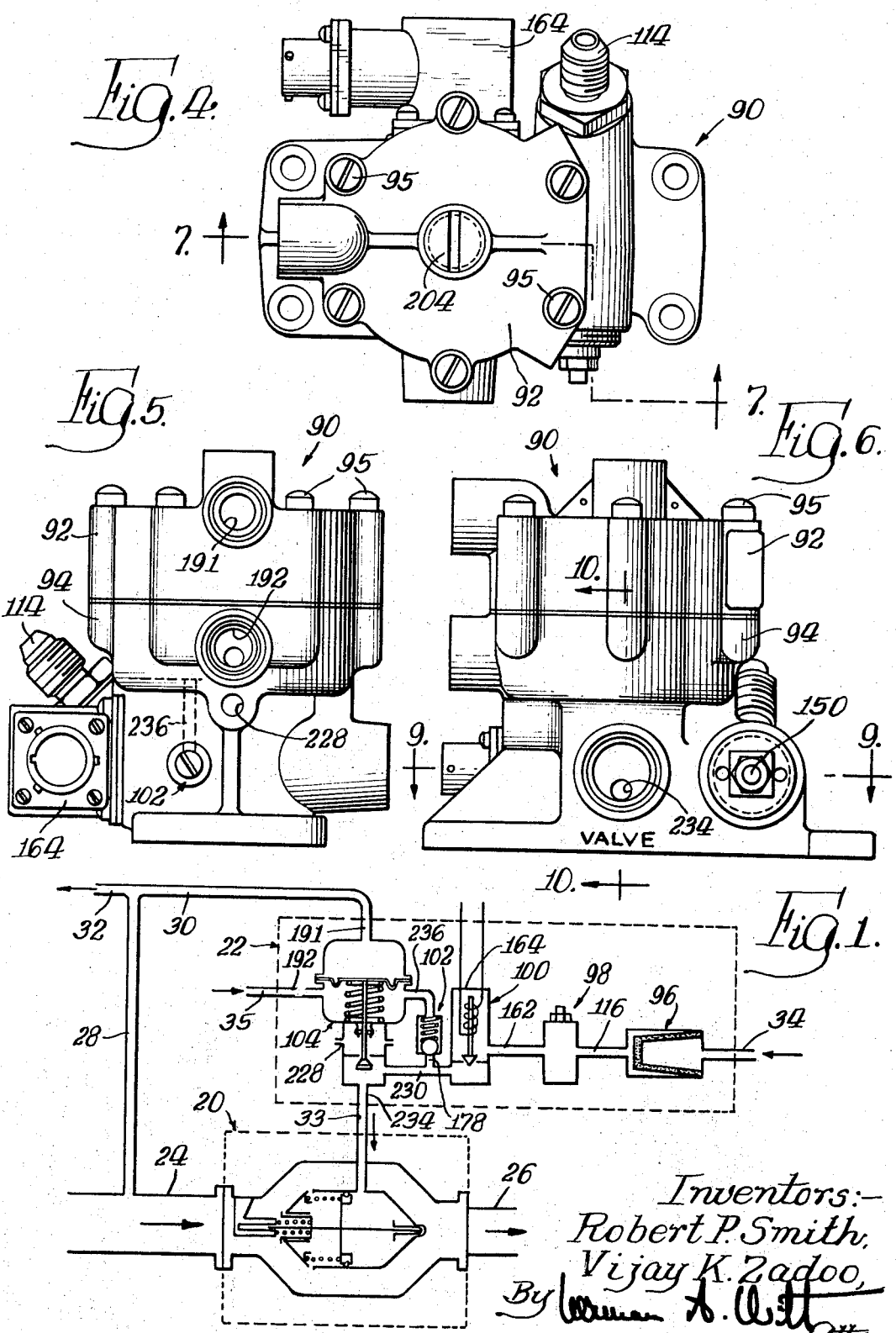
FIGURE 1 is a schematical diagram of the fluid pressure regulating system of our present invention.

Referring now to FIGURE 1, there is shown schematically a preferred embodiment of fluid pressure regulating system incorporating the principles of our present invention. This system comprises a pressure regulating and relief valve indicated generally by the reference numeral 20, and a pressure control unit indicated generally by the reference numeral 22. The upstream end, or the left-hand end as viewed in FIGURE 1, of the valve 20 has suitable connection with a main conduit 24 which receives fluid under pressure from a source not shown, while the downstream end, or the right-hand end, of the valve 20 has suitable connection with a discharge conduit 26. The main conduit 24 also has connected thereto an auxiliary conduit 28 which has one section 30 communicating with the pressure control unit 22 and which has a discharge section 32. In addition, the valve 20 and the control unit 22 are interconnected by a conduit member 33.

The fluid pressure regulating system of our present invention is especially adapted for use in various aircraft applications. In one such application, using pressurized air, the discharge conduit 26 opens into one enclosed area such as the cabin of the aircraft, while the discharge section 32 is connected with a second enclosed area such as the pressurized suit (not shown) of an occupant of the aircraft. Also, for control purposes, the unit 22 has connected thereto a conduit 34 communicating with a high pressure air source, and a conduit 35 communicating with the cabin. With the foregoing arrangement, which will be described in greater detail hereinafter, the air pressure at the inlet of the aircraft pressure suit is maintained at the desired value above the cabin pressure whether the cabin is pressurized or unpressurized. More specifically, the pressure control unit 22 senses the cabin and pressure suit pressures and is operative to vary the position of the valve elements of the valve 20 whereby to maintain the pressure in the suit at the desired relative value.

Figure 2:
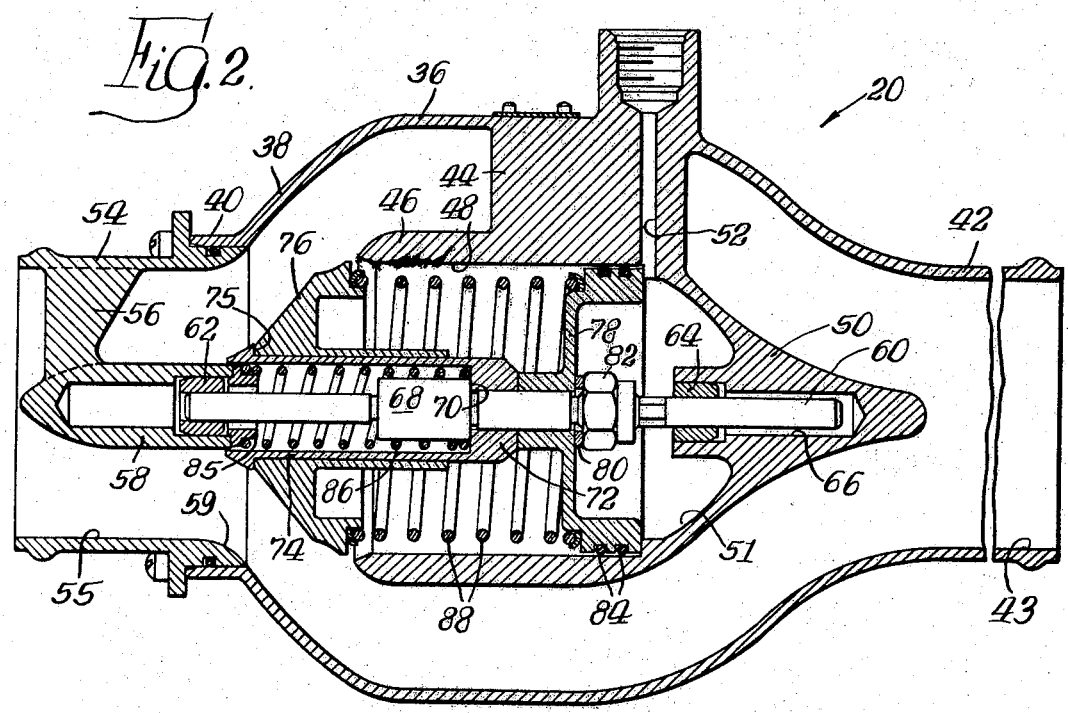
FIGURE 2 is a median vertical longitudinal sectional view of the pressure regulating and relief valve of our present invention, with the movable parts thereof being shown in one operative position.
Figure 3:
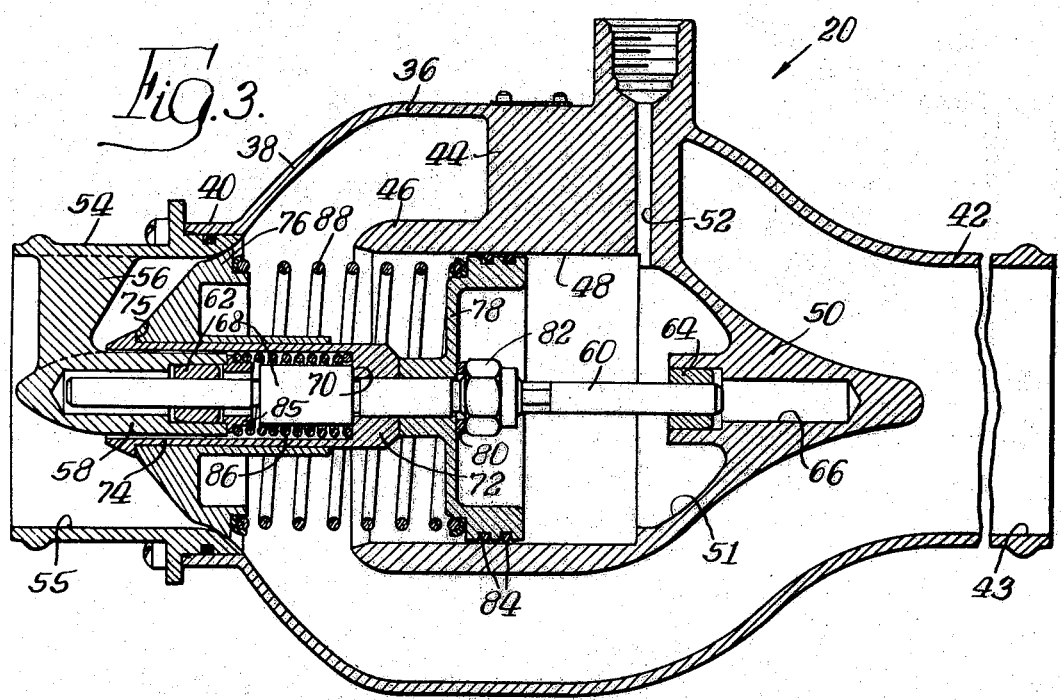
FIGURE 3 is a median vertical longitudinal sectional view corresponding generally to FIGURE 2, but showing the movable parts of the valve in a second operative position.

Referring now to FIGURES 2 and 3, we shall describe the details of construction of the pressure regulating and relief valve 20. The valve 20 comprises a housing or body 36 having a reduced upstream end portion 38 terminating in a collar portion 40, and a reduced downstream end portion 42 serving to define an outlet opening 43. The housing 36 further includes one or more depending rib or wall portions 44 supporting a central axial cylinder portion 46 having a bore 48 therein, which is open in an upstream direction, and which is closed in a downstream direction by a tapered nose portion 50 whereby to define an actuation chamber 51. The rib portion 44 is formed with a radial pasageway 52 communicating at its inner end with the actuation chamber 51 and at its outer end with the conduit member 33 (FIGURE 1). Suitably secured within the collar portion 40 of the housing 36 is a housing extension or end fitting 54 which serves to define an inlet opening 55, and which has one or more depending rib portions 56 supporting a central axial tubular portion 58 extending in the direction of the cylinder portion 46. The inner face of the end fitting 54 is bevelled, as at 59, to define a valve seat. The end fitting 54 and the housing end 42 are connected, respectively, to the main conduit 24 and the discharge conduit 26 (FIGURE 1).

Disposed within the housing 36 is a central axial shaft 60. One end of the shaft 60 is slidably mounted in a bearing 62 secured in the end of the tubular portion 58 of the housing extension 54, and the other end of the shaft 60 is slidably mounted in a bearing 64 secured within axial aperture means 66 formed in the tapered nose portion 50. The shaft 60, intermediate of its ends, is provided with an enlarged portion 68 having a radial bearing face 70. Mounted on the shaft 60 and engaging the radial bearing face 70 is the flange portion 72 of a guide sleeve 74. The sleeve 74 is provided with an annular shoulder stop 75. Slidably mounted on the guide sleeve 74 is a poppet or valve member 76 that is engageable with the valve seat 59. Also mounted on the shaft 60 is a piston 78. The guide sleeve 74 and the piston 78 are maintained in position on the shaft 60 by means of a washer 80 and a retaining nut 82 threaded on an intermediate portion of the shaft. The piston 78 is arranged for sliding movement within the cylinder portion 46 and is provided with O-ring seals 84 that frictionally engage the inner surface of the bore 48. Interposed between a spring seat 85 at the inner end of the tubular portion 58 and the guide sleeve flange 72 is a compression coil spring 86 which serves normally to urge the guide sleeve 74 and the piston 78 to the position shown in FIGURE 2. Interposed between the poppet 76 and the piston 78 is a compression coil spring 88 which serves normally to maintain the poppet 76 and the piston 78 in the axially spaced relation shown in FIGURES 2 and 3 with the poppet 76 abutting the shoulder 75 of the guide sleeve 74. To minimize pressure loss and maximize flow through the valve, the inlet opening 55, the outlet opening 43, the poppet valve 76, and the piston 78 are coaxially arranged; and the surfaces of the various valve elements are contoured to minimize resistance to the smooth flow of fluid in the normal flow mode.

Figure 7:
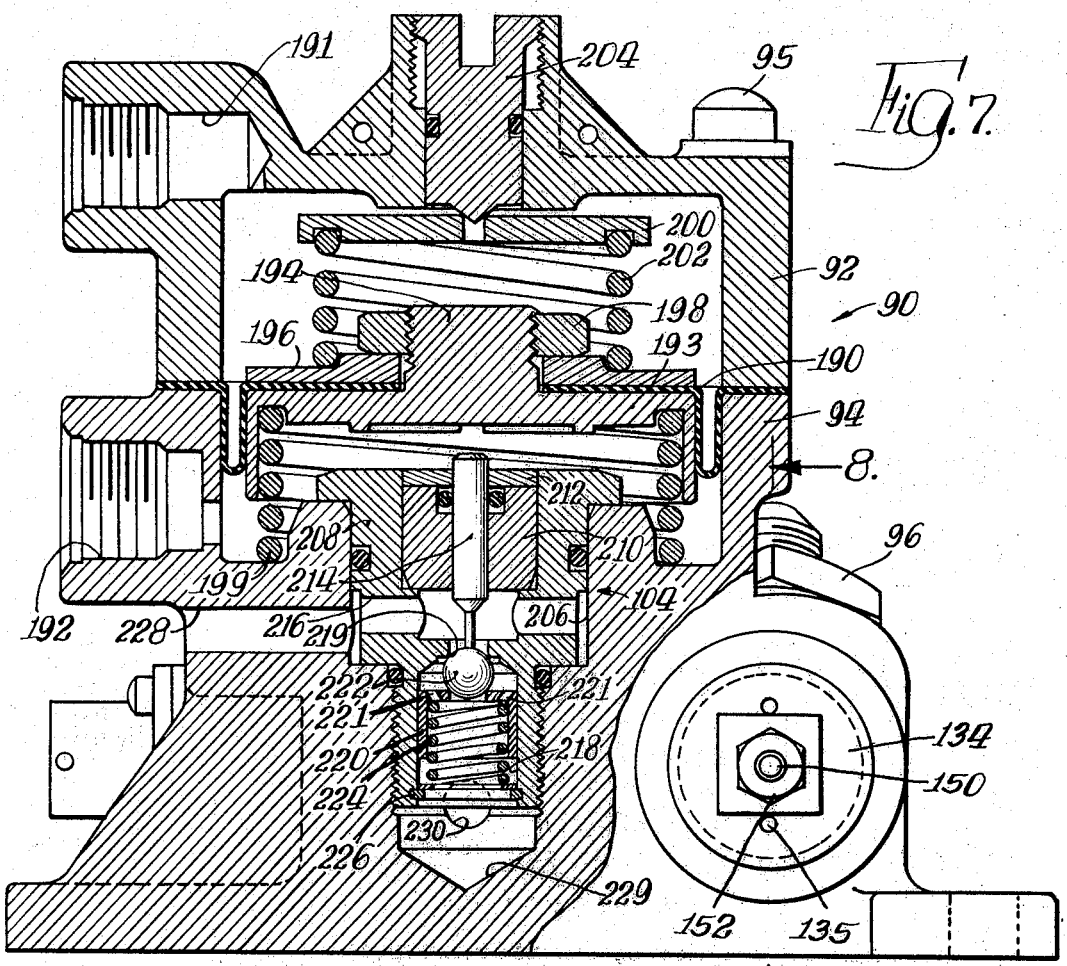
FIGURE 7 is a sectional view, on an enlarged scale, taken substantially along the line 7—7 in FIGURE 4, looking in the direction indicated by the arrows.

Referring now to FIGURES 4 through 10, we shall describe the details of construction of the pressure control unit 22 of our present invention. The pressure control unit 22 comprises a housing or body 90 which includes an upper housing section 92 and a lower housing section 94 suitably secured together by a plurality of machine screws 95. The housing 90 has mounted therein a filter assembly 96 (FIGURES 1 and 8), a pressure regulator 98 (FIGURES 1, 8 and 9), a solenoid operated control valve 100 (FIGURES 1, 9 and 10) which serves as an on-off control of the system, a relief valve 102 (FIGURES 1 and 9), and a diaphragm operated bleed valve assembly 104 (FIGURES 1, 7 and 10).

Figure 8:
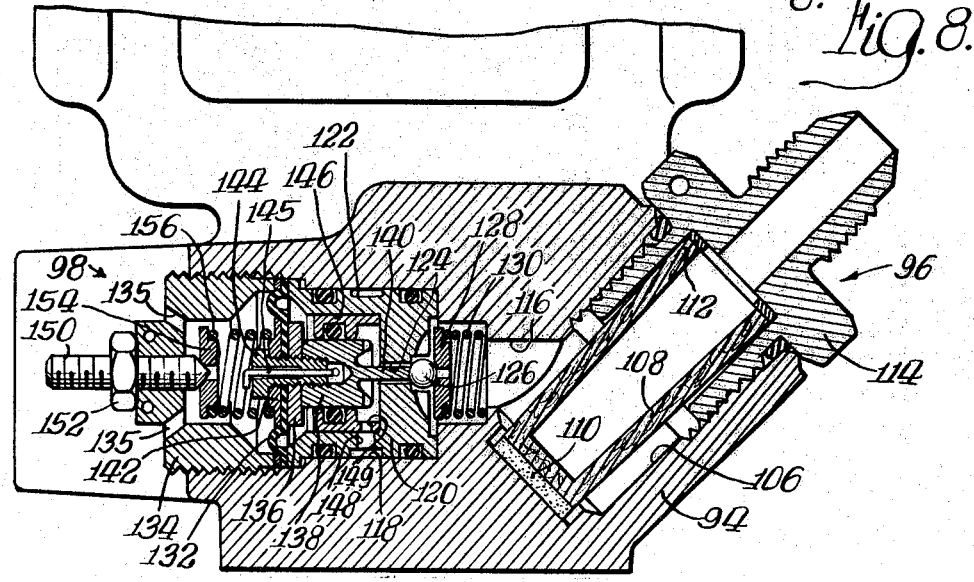
FIGURE 8 is a sectional view, taken substantially along the line 8—8 in FIGURE 7, looking in the direction indicated by the arrows.

As shown in FIGURE 8, the lower housing section 94 is provided with an opening 106 which serves to receive a filter member 108 held in position by means of a gasket 110, a spacer 112, and a cap member 114 suitably threaded into the outer end of the housing opening 106. The cap member 114 has suitable connection with the air supply conduit 34 identified in FIGURE 1, while the housing opening 106, adjacent its lower end, communicates through a passageway 116 with the pressure regulator 98 to be presently described.

As best shown in FIGURES 8 and 9, the lower housing section 94 is also provided with a stepped opening 118 in which is disposed a cylinder 120 having an annular channel 122 formed in the outer periphery thereof and having a central axial port 124 formed in the radial wall thereof. Arranged for seating engagemnet with the one end of the port 124 is a ball 126 normally biased to the left, as viewed in FIGURE 8, by means of a disc 128 and a spring 130. Extending across the open end of the cylinder 120 is a diaphragm 132 which is maintained in position by means of a cap member 134 threaded into the outer end of the opening 118 and having apertures 135 therein. Disposed on one side of the diaphragm 132 within the cylinder 120 is a washer 136 and a plunger 138 having a nose portion 140 of reduced diameter projecting through the axial port 124 and engageable with the ball 126. Disposed on the other side of the diaphragm 132 outwardly of the cylinder 120 is a pressure plate 142. Extending axially through the pressure plate 142, diaphragm 132 and washer 136, and into the plunger 138 for maintaining these members in assembled relation is a screw 144 provided with a metering rod 145. Arranged concentrically about the plunger 138 is an annular spacer and seal assembly 146. Suitable radial ports 148 and 149 are provided in the cylinder 120 and in the spacer assembly 146 whereby to place the annular channel 122 in communication with the interior of the cylinder 120. Threaded axially through the cap member 134 is a set screw 150 with a locknut 152. Seated at the inner end of the set screw 150 is a disc 154, and interposed between the pressure plate 142 and the disc 154 is a coil spring 156. The set screw 150, acting through the spring 156 and diaphragm assembly, serves to position axially the nose portion 140 of the plunger 138 thereby normally to space the ball 126 from the adjacent end of the port 124 whereby to permit air from the passageway 116 to flow through the regulator 98. If the pressure within the cylinder 120 exceeds the predetermined desired value, the diaphragm 132 is moved to the left as viewed in FIGURE 8, the plunger nose portion 140 is withdrawn from engagement with the ball 126, and the spring 130 biases the ball 126 into seating engagement with the port 124 for closing the regulator 98. The regulator 98 will open again when the pressure therein decreases to the predetermined value. The pressure at which the regulator 98 closes and opens may be altered by adjusting the set screw 150.

As shown in FIGURES 9 and 10, the solenoid operated control valve 100 includes a valve member 157 normally spring biased into engagement with the axial orifice 158 of a fitting 159 mounted in an opening 160 formed in the lower housing section 94. The opening 160 communicates with the opening 118 of the pressure regulator assembly 98 through a passageway 162. The valve member 157 is actuated by means of a solenoid unit 164 suitably secured to the side of the lower housing section 94 by means of bolts 166. The fitting 159 is also provided with radial ports 167 and with an O-ring seal 168 that engages the inner cylindrical surface of the valve opening 160. Mounted within the lower housing section 94, adjacent the solenoid operated control valve 100 as shown in FIGURE 9, is the relief valve 102. An opening 170 formed in the lower housing section 94 serves to receive a sleeve member 172 having a valve seat disc 174 at its inner end with an aperture 176 therethrough which communicates through a passageway 178 with the opening 160 of the solenoid operated control valve 100. Normally seating against the disc 174 for closing the aperture 176 is the head of a poppet member 180 having a stem portion 182 slidably received in the bore 184 of an adjusting screw 186 threaded into the sleeve member 172. A spring 188, which is interposed between the head of the poppet member 180 and the inner end of the adjusting screw 186, serves to bias the poppet member 180 into engagement with the valve seat disc 174.

The diaphragm operated bleed valve assembly 104, as best shown in FIGURES 7 and 10, includes a diaphragm 190 which at its peripheral edge is secured between the upper and lower housing sections 92 and 94. The chamber within the housing section 92 above the diaphragm 190 communicates through a passageway or inlet 191 with the auxiliary conduit section 30, while the chamber within the housing section 94 below the diaphragm 190 communicates through a passageway or inlet 192 with the conduit 35 connected with the cabin (see FIGURE 1). Mounted at the lower surface of the diaphragm 190 is a pressure plate 193 having an axial extension 194 that projects upwardly through the diaphragm 190 and a washer 196. To maintain these members in assembled relation, a nut 198 is threaded onto the upper end of the pressure plate extension 194. Interposed between the pressure plate 193 and the housing section 94 is a coil spring 199, and interposed between the washer 196 and a spring adjusting disc 200 is a coil spring 202. Threaded through the wall of the upper housing section 92 is an adjustment screw 204 which at its inner end engages the spring adjusting disc 200. Suitably formed in the lower housing section 94 immediately below the diaphragm 190 is a stepped cavity 206. Mounted within the stepped cavity 206 is a nozzle member 208 in the upper end of which is disposed a bearing 210 and a washer 212 through which extends a rod 214. The nozzle member 208 is also formed with transverse passageway means 216, a lower opening 218, and an intermediate valve seat 219. Slidably mounted in the opening 218 is a cup shaped member 220 having ports 221. The member 220 serves as a support for a ball member 222 that is engageable with the valve seat 219 and the lower end of the rod 214. The cup shaped member 220 and the ball member 222 are normally biased upwardly by means of a coil spring 224 interposed between the member 220 and a retaining ring 226. When the diaphragm 190 is in the position shown in FIGURES 7 and 10, the ball 222 engages the seat 219 thereby closing off communication between the passageway 216 and opening 218. However, when the pressure in the chamber above the diaphragm exceeds the pressure in the chamber below the diaphragm by a predetermined amount, the diaphragm moves downwardly thereby causing the pressure plate 193 to engage and move downwardly the rod 214. The rod 214 thereupon pushes downwardly on the ball 222 unseating the latter from the valve seat 219. This action places the passageway 216 and the opening 218 in communication. Upon return of the diaphragm 190 to its normal position, the ball 222 is reseated on the valve seat 219 under the force of the spring 224. The differential in pressure at which the bleed valve 104 is opened and closed may be altered by adjusting the screw 204. As shown in FIGURE 7, the transverse passageway means 216 in the nozzle member 208 communicates with a passageway 228 opening outwardly of the lower housing section 94 to the atmosphere, while, as shown in FIGURE 10, the cavity 229 at the lower end of the opening 218 in the nozzle member 208 communicates through a passageway 230 and a flow control orifice 232 with the opening 160 of the solenoid operated control valve 100, and also communicates through a passageway 234 with the conduit member 33 (FIGURE 1). In addition, the interior of the sleeve member 172 of the relief valve 102 communicates through a passageway 236 (FIGURES 1 and 5) with the interior of the lower housing section 94 immediately below the diaphragm 190. The pressure regulator 98 and the relief valve 102 serve, in two stages, to control the varying pressure of the high pressure air entering a conduit 35 so as to render the same usable as a servo air pressure for actuation of the valve 20.

When the above-described air pressure control system is wholly inactive, the movable parts of the pressure regulating and relief valve 20 assume the position shown in FIGURE 2. More particularly, the coil spring 86 serves to bias the piston 78 to the right-hand end of the cylinder portion 46, while the spring 88 serves to bias the poppet 76 into engagement with the shoulder stop 75 of the guide sleeve 74. With the poppet 76 and the piston 78 so disposed, the valve 20 is in a fully open position, and the main conduit 24 and the discharge conduit 26 are in communication. At the same time, the solenoid unit 164 is unenergized, and the valve member 157 of the solenoid operated control valve 100 is spring biased into engagement with the orifice 158 thus closing off communication between the actuation chamber 51 of the pressure regulating and relief valve 20 and the air supply conduit 34.

Now when the cabin and suit are to be pressurized, air under pressure is directed into the main conduit 24. In the absence of activation of the pressure control unit 22, such air will flow through the valve 20 and discharge conduit 26 to the cabin and will also flow through the auxiliary conduit 28 and discharge section 32 to the suit. As air under pressure is directed into the main conduit 24, air under pressure is also directed into the conduit 34 which connects with the cap member 114 of the filter assembly 96 of the pressure control unit 22. Additionally, the solenoid unit 164 is energized for retracting the valve member 157 away from the orifice 158. Under these conditions of operation, air under pressure flows through the filter member 108 to the passageway 116. From the passageway 116 the fluid under pressure flows through the pressure regulator 98, and more specifically through the axial port 124, radial ports 148 and 149, and annular channel 122, to the passageway 162 which communicates through the opening 160, ports 167, orifice 158, flow control orifice 232, and passageway 230 with the cavity 229 at the bottom end of diaphragm bleed valve 104. From this cavity 229 the air under pressure flows through the passageway 234, the conduit member 34 interconnecting the pressure control unit 22 and the pressure regulating and relief valve 20, and the passageway 52 of the valve 20 to the actuation chamber 51 therein. The air under pressure entering the actuation chamber 51 tends to urge the piston 78 from the position shown in FIG. 2 to the position shown in FIGURE 3. Because the coil spring 88 serves to maintain the poppet 76 against the shoulder stop 75, the poppet 76 tends to move into engagement with the valve seat 59 closing the valve 20. The valve 20 modulates the flow of air under pressure to the suit and cabin and controls the upstream or back pressure by varying its flow area which is determined by the position of the poppet valve 76 relative to the valve seat 59. The position of the poppet 76, in turn, is determined by the balance of forces acting thereon. More specifically, the upstream pressure acting on the poppet 76 and the force of the spring 86 tend to open the valve, while the pressure in the actuation chamber 51 acting on the piston 78 tends to close the valve.

As air under pressure flows through the pressure control unit 22 and the pressure regulating and relief valve 20 as described, air under pressure entering the main conduit 24 and the auxiliary conduit 28 is transmitted through the conduit section 30 and the passageway 191 to the interior of the cavity within the pressure control unit 22 immediately above the diaphragm 190. Simultaneously, air under pressure from the cabin is directed through the conduit 35 to the passageway 192 communicating within the interior of the cavity within the pressure control unit 22 immediately below the diaphragm 190. Accordingly, the control unit 22 senses the air pressures in the suit and cabin; and the position of the diaphragm 190 is determined by a balance between (a) the composite force of the pressure in the pressure unit and the coil spring 202 acting downwardly on the diaphragm 190 and (b) the composite force of the pressure in the cabin and the coil spring 199 acting upwardly on the diaphragm 190. The position of the diaphragm 190, in turn, determines the position of the bleed valve actuator rod 214 and, correspondingly, the amount of bleed air flow out of the actuation chamber 51 whereby to maintain the desired air pressure in the suit.

When the pressure in the suit is too high, that is, when the difference between the pressure in the suit and the pressure in the cabin is greater than the desired value, the diaphragm 190 moves downwardly and depresses the rod 214 which in turn unseats the ball 222 thereby opening the cavity 229 to the atmosphere through the passageway means 216 and 228. When the bleed valve 104 is thus opened, it bleeds the servo air (and the valve actuation chamber 51) to atmosphere. As a consequence, the pressure within the valve acutation chamber 51 decreases thus permitting spring 86 to move the piston 78 back toward the position shown in FIGURE 2 thereby opening the valve 20. Communication is again established between the main conduit 24 and the cabin, and the pressure in the suit will decrease to the desired value.

When the pressure in the suit is too low, the diaphragm 190 moves upwardly and the pressure plate 193 is withdrawn from engagement with the upper end of the rod 214 whereupon the bleed valve spring 224 and cup shaped member 220 serve to return the ball 222 toward engagement with the seat 219 thus decreasing the bleed air flow. At this time, the pressure in the valve actuation chamber 51 increases and the valve 20 is closed as shown in FIGURE 3 thereby interrupting communication between the main conduit 24 and the cabin until the pressure in the suit increases to the desired value. The screw 204 of the bleed valve assembly 104 may be adjusted to regulate the desired pressure that is to be maintained in the pressurized suit. The regulating system may be shut off by de-energizing the solenoid unit 164 whereupon the valve member 157 returns to closed position.

Figure 11:
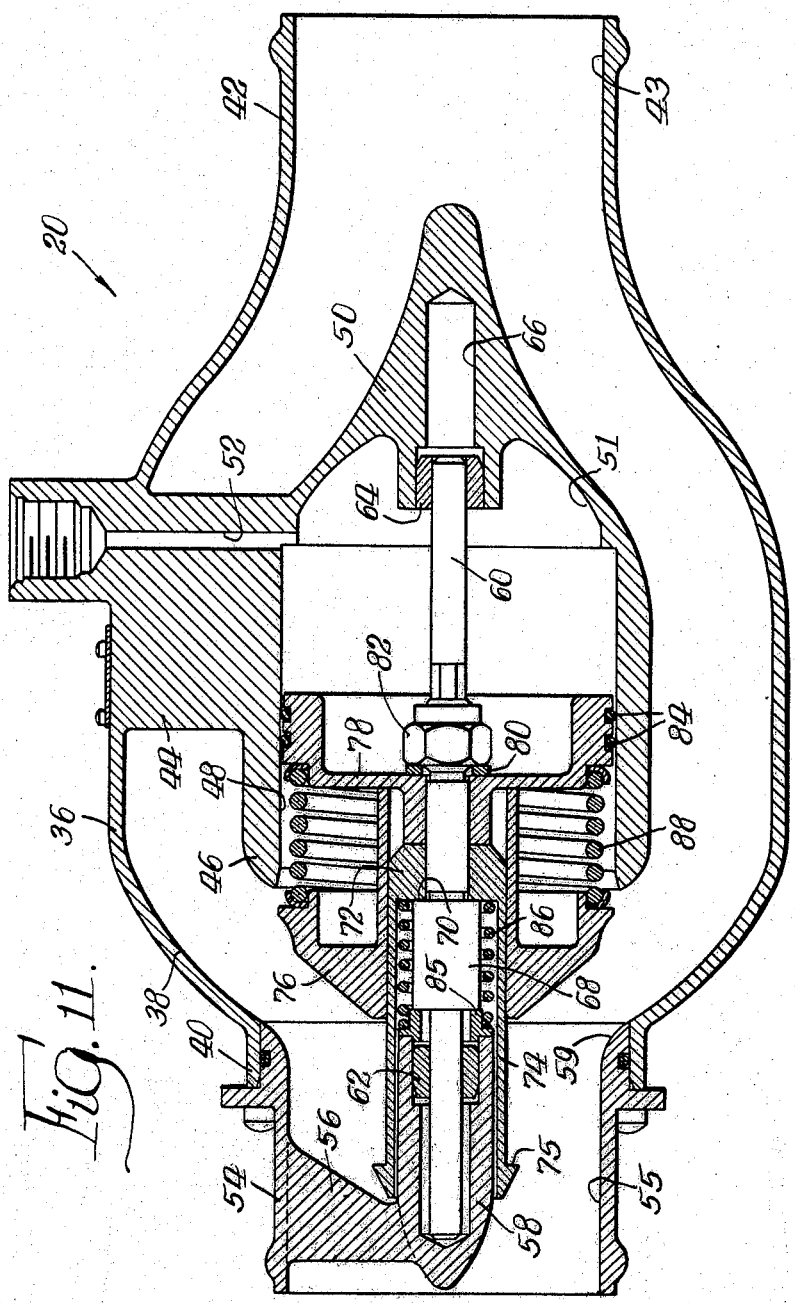
FIGURE 11 is a median vertical longitudinal sectional view of the pressure regulating and relief valve of our present invention, with the movable parts thereof being shown in pressure relief position.

In the case of malfunction of the system causing overpressurization of the actuation chamber 51 of the valve 20, the valve initially will be closed with the poppet 76 engaging the valve seat 59 and with the enlarged portion 68 on shaft 60 stopping against the spring seat 85. However, in this condition of operation, there will be an increase of the upstream (or pressure suit) pressure, and when it rises to a value where the product of such pressure times the poppet area exceeds the force of the spring 88, the poppet 76 will move axially away from the shoulder stop 75 along the guide sleeve 74 toward the position shown in FIGURE 11 allowing air to flow past the poppet 76 and through the valve 20 to the cabin, thus preventing overpressurization of the pressure suit. The value of the pressure of the air in the suit that initiates the relief operation is higher than the normal regulated value; therefore, in normal operation the poppet 76 is held firmly against the shoulder stop 75 on the guide sleeve 74. By reason of incorporating a one-piece combined back pressure regulating and relief poppet valve 76 in the valve 20, no separate relief valve is required; thus, the weight and cost of the pressure regulating system are minimized. Preferably, the sides of the valve 20 are flattened so as to allow the valve to be fitted in a narrow space. Next, it is to be noted that the valve 20 and the control unit 22 are fabricated as separate units. Accordingly, the valve 20 may be placed in an adverse environment without affecting control accuracy because the control unit 22 may be placed at a remote location in a more compatible environment. Finally, the above described pressure regulating system controls the upstream pressure at a fixed value above cabin pressure. If desired, the conduit 35 may be connected to atmosphere rather than to the pressurized cabin, in which case the system will maintain the upstream pressure at a fixed value above ambient pressure.

While we have shown and described what we believe to be a preferred embodiment of our present invention, it will be understood by those skilled in the art that various rearrangements and modifications may be made therein without departing from the spirit and scope of our invention.

We claim:
1. A pressure regulating system for fluid flow, comprising: upstream conduit means; downstream conduit means; a valve assembly comprised of a housing having an inlet opening communicating with said upstream conduit means and having an outlet opening communicating with said downstream conduit means, a cylinder within said housing, a piston slidable in said cylinder, a valve member associated with said piston, and means for normally biasing said piston and said valve member in one direction whereby to maintain said valve member spaced from said inlet opening to permit flow of fluid through said valve housing; and a pressure control unit for conveying fluid under pressure to said cylinder for moving said piston in the other direction whereby said valve member is moved toward a position closing said inlet opening to restrict flow of fluid through said valve housing, said pressure control unit including bleed valve means for selectively relieving the pressure of the fluid being conveyed to said cylinder to permit said piston to move in said one direction and said valve member to return to a position spaced from said inlet opening, diaphragm means at one side being exposed to the pressure of the fluid in said upstream conduit means and at the other side being exposed to a reference pressure, and said diaphragm means being responsive to the difference between the pressure of the fluid in said upstream conduit means and said reference pressure for actuating said bleed valve means.

2. A pressure regulating system for fluid flow comprising: upstream conduit means; downstream conduit means for delivering fluid to a first enclosed area; auxiliary conduit means for conveying fluid from said upstream conduit means to a second enclosed area; a combined pressure regulating and relief valve assembly comprised of a housing having an inlet opening communicating with said upstream conduit means and having an outlet opening communicating with said downstream conduit means, said housing having intermediate wall means defining a cylinder open in the direction of said inlet opening, a tubular member suspended in said inlet opening, a shaft slidably mounted at its one end in said tubular member and at its other end in said intermediate wall means, a piston secured on said shaft and slidable in said cylinder, a guide sleeve secured at one end to said shaft, a valve member slidably mounted on said guide sleeve, first spring means interposed between said piston and said valve member for normally maintaining the same in predetermined axial spaced relation, second spring means interposed between said tubular member and said guide sleeve for normally biasing the latter and said piston away from said inlet opening whereby to maintain said valve member spaced from said inlet opening to permit flow of fluid through said valve housing, said intermediate wall means having passageway means therein for conveying fluid under pressure to the interior of said cylinder for moving said piston and guide sleeve toward said inlet opening whereby to move said valve member toward a position closing said inlet opening to restrict flow of fluid through said valve housing, and said valve member being movable relative to said piston and away from said inlet opening when the pressure of fluid at said inlet opening exceeds a predetermined value whereby to relieve the latter pressure; and a pressure control unit for conveying fluid under pressure to said passageway means of said intermediate wall means, said pressure control unit including bleed valve means for selectively relieving the pressure of the fluid being conveyed to said cylinder to permit said valve member to move away from said inlet opening, diaphragm means at one side being exposed to the pressure of the fluid in said first enclosed area and at the other side being exposed to the pressure of the fluid in the second enclosed area, and said diaphragm means being responsive to the difference between the pressure of the fluid in the first enclosed area and the pressure of the fluid in the second enclosed area for actuating said bleed valve means.

3. A pressure regulating system for fluid flow comprising: upstream conduit means; downstream conduit means for delivering fluid to a first enclosed area; auxiliary conduit means for conveying fluid from said upstream conduit means to a second enclosed area; a combined pressure regulating and relief valve assembly comprised of a housing having an inlet opening communicating with said upstream conduit means and having an outlet opening communicating with said downstream conduit means, said housing having intermediate wall means defining a cylinder open in the direction of said inlet opening, a tubular member suspended in said inlet opening, a shaft slidably mounted at its one end in said tubular member and at its other end in said intermediate wall means, a piston secured on said shaft and slidable in said cylinder, a guide sleeve secured at one end to said shaft, a valve member slidably mounted on said guide sleeve, first spring means interposed between said piston and said valve member for normally maintaining the same in predetermined axial spaced relation, second spring means interposed between said tubular member and said guide sleeve for normally biasing the latter and said piston away from said inlet opening whereby to maintain said valve member spaced from said inlet opening to permit flow of fluid through said valve housing, said intermediate wall means having passageway means therein for conveying fluid under pressure to the interior of said cylinder for moving said piston and guide sleeve toward said inlet opening whereby to move said valve member toward a position closing said inlet opening to restrict flow of fluid through said valve housing, and said valve member being movable relative to said piston and away from said inlet opening when the pressure of fluid at said inlet opening exceeds a predetermined value whereby to relieve the latter pressure; and a pressure control unit for conveying fluid under pressure to said passageway means of said intermediate wall means, said pressure control unit being comprised of a housing, diaphragm means within said housing, first spring means in said housing on one side of said diaphragm means for biasing the latter in one direction, second spring means in said housing on the other side of said diaphragm means for biasing the latter in the other direction, first inlet means in said housing for placing one side of said diaphragm means in communication with the fluid under pressure in said first enclosed area, second inlet means for placing the other side of said diaphragm means in communication with the pressure of the fluid in the second enclosed area, bleed valve means including a normally closed valve element for selectively relieving the pressure of the fluid being conveyed to said cylinder to permit said valve member to move away from said inlet opening, and means responsive to movement of said diaphragm means for opening said valve element when the difference between the pressure of the fluid on the one side of said diaphragm means and the pressure of the fluid on the other side of said diaphragm means exceeds a predetermined value.

4. A combined pressure regulating and relief valve assembly, comprising a housing having axially aligned inlet and outlet openings and intermediate wall means defining a cylinder open in the direction of said inlet opening, a tubular member suspended in said inlet opening, a shaft slidably mounted at its one end in said tubular member and at its other end in said intermediate wall means, a piston secured on said shaft and slidable in said cylinder, a guide sleeve secured at one end to said shaft, a valve member slidably mounted on said guide sleeve, first spring means interposed between said piston and said valve member for normally maintaining the same in predetermined axial spaced relation, second spring means interposed between said tubular member and said guide sleeve for normally biasing the latter and said piston away from said inlet opening whereby to maintain said valve member spaced from said inlet opening to permit flow of fluid through said valve housing, said intermediate wall means having passageway means therein for conveying fluid under pressure to the interior of said cylinder for moving said piston and guide sleeve toward said inlet opening whereby to move said valve member toward a position closing said inlet opening to restrict flow of fluid through said valve housing, and said valve member being movable relative to said piston and away from said inlet opening when the pressure of fluid at said inlet opening exceeds a predetermined value whereby to relieve the latter pressure.

5. A valve assembly comprising a housing, diaphragm means within said housing, first spring means in said housing on one side of said diaphragm means for biasing the latter in one direction, adjustment means on said one side of said diaphragm means for adjusting the biasing force of said first spring means, second spring means in said housing on the other side of said diaphragm means for biasing the latter in the other direction, first inlet means in said housing for placing said one side of said diaphragm means in communication with one source of fluid, second inlet means in said housing for placing said other side of said diaphragm means in communication with a second source of fluid, fluid passageway means for conveying fluid under pressure through said housing, bleed passageway means in said housing on said other side of said diaphragm means, a ball valve element normally spring biased to a position closing off communication between said fluid passageway means and said bleed passageway means, and means responsive to movement of said diaphragm means for moving said ball valve element to a position opening communication between said fluid passageway means and said bleed passageway means when the difference between the pressure of the fluid on said one side of said diaphragm means exceeds the pressure of the fluid on said other side of said diaphragm means by a predetermined value.

6. A combined pressure regulating and relief valve assembly, comprising a housing having axially aligned inlet and outlet openings and intermediate wall means defining a cylinder open in the direction of said inlet opening, a support member suspended in said inlet opening, shaft means slidably mounted at its one end in said support member and at its other end in said intermediate wall means, a piston secured on said shaft means and slidable in said cylinder, a valve member slidably mounted on said shaft means, first spring means interposed between said piston and said valve member for normally maintaining the same in predetermined axial spaced relation, second spring means interposed between said support member and said shaft means for normally biasing the latter and said piston away from said inlet opening whereby to maintain said valve member spaced from said inlet opening to permit flow of fluid through said valve housing, said intermediate wall means having passageway means therein for conveying fluid under pressure to the interior of said cylinder for moving said piston and shaft means toward said inlet opening whereby to move said valve member toward a position closing said inlet opening to restrict flow of fluid through said valve housing, and said valve member being movable relative to said piston and away from said inlet opening when the pressure of fluid at said inlet opening exceeds a predetermined value whereby to relieve the latter pressure.

References Cited

UNITED STATES PATENTS

| | | | |
|---|---|---|---|
| 2,007,554 | 7/1935 | Westberberg | 137—489 |
| 2,537,347 | 1/1951 | Hieger et al. | 251—61 X |
| 2,592,474 | 4/1952 | Schnyder | 137—219 |
| 2,892,468 | 5/1959 | Beuchle | 251—77 X |
| 3,051,070 | 8/1962 | Shaw | 98—1.5 |
| 3,172,420 | 3/1965 | Brown et al. | 137—219 |
| 3,294,105 | 12/1966 | Schaub | 137—118 X |

M. CARY NELSON, *Primary Examiner.*

M. O. STURM, *Assistant Examiner.*